(12) United States Patent
Hara et al.

(10) Patent No.: US 7,412,578 B2
(45) Date of Patent: Aug. 12, 2008

(54) SNAPSHOT CREATING METHOD AND APPARATUS

(75) Inventors: Junichi Hara, Yokohama (JP); Takahiro Nakano, Yokohama (JP); Koji Sonoda, Sagamihara (JP); Takayoshi Iitsuka, Sagamihara (JP); Yutaka Takata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/519,877

(22) Filed: Sep. 13, 2006

(65) Prior Publication Data

US 2007/0011418 A1    Jan. 11, 2007

Related U.S. Application Data

(63) Continuation of application No. 10/369,690, filed on Feb. 21, 2003, now Pat. No. 7,120,767.

(30) Foreign Application Priority Data

Nov. 27, 2002    (JP)    ............... 2002-344042

(51) Int. Cl.
G06F 12/16    (2006.01)
(52) U.S. Cl. ..................... 711/162; 707/204
(58) Field of Classification Search ............... 711/162; 707/204
See application file for complete search history.

(56) References Cited

U.S. PATENT DOCUMENTS

| | | | |
|---|---|---|---|
| 5,790,773 A | 8/1998 | DeKoning et al. | |
| 5,819,292 A | 10/1998 | Hitz et al. | |
| 5,835,953 A | 11/1998 | Ohran | |
| 6,829,617 B2 * | 12/2004 | Sawdon et al. | 707/102 |
| 6,836,830 B1 | 12/2004 | Yamagami et al. | |
| 2002/0112022 A1 | 8/2002 | Kazar et al. | |
| 2003/0084242 A1 | 5/2003 | Strange et al. | |
| 2003/0182322 A1 * | 9/2003 | Manley et al. | 707/201 |
| 2003/0229651 A1 | 12/2003 | Mizuno et al. | |
| 2004/0002934 A1 | 1/2004 | Taulbee et al. | |
| 2004/0030846 A1 | 2/2004 | Armangau et al. | 711/154 |
| 2004/0059878 A1 | 3/2004 | Madany | |

FOREIGN PATENT DOCUMENTS

JP    2000 347811    12/2000

OTHER PUBLICATIONS

Card et al., Design and Implementation of the Second Extended Filesystem, Proceedings of the First Dutch International Symposium on Linux, Dec. 1994 [retreived on Sep. 26, 2007], retrieved from internet :<URL: http://web.mit.edu/tytso/www/linux/ext2intro.html>.*

* cited by examiner

Primary Examiner—Kevin Ellis
Assistant Examiner—Jared I Rutz
(74) Attorney, Agent, or Firm—Mattingly, Stanger, Malur & Brundidge, P.C.

(57) ABSTRACT

In the storage-based snapshot creation, a block-selection specifying unit provided on a NAS processing unit specifies a block, which becomes necessary for the generation of snapshot data, to a specified-block analyzing unit within a disk apparatus. Moreover, a disk controller generates the snapshot data on the block specified as the snapshot target, while making an inquiry to the specified-block analyzing unit. This makes it possible to create the snapshot in a storage-capacity reduced manner, and to specify the snapshot creation in a partition, file, or directory unit.

14 Claims, 8 Drawing Sheets

| OPERATIONAL DATA STORING REGION | | SNAPSHOT DATA STORING REGION | |
|---|---|---|---|
| STORING-REGION IDENTIFYING NUMBER | BLOCK ADDRESS | STORING-REGION IDENTIFYING NUMBER | BLOCK ADDRESS |
| 0 | 100 | 1 | 10 |
| 0 | 140 | 1 | 50 |
| 0 | 180 | 1 | 90 |
| ⋮ | ⋮ | ⋮ | ⋮ |

400

SNAPSHOT CREATING METHOD AND APPARATUS

The present application is a continuation of application Ser. No. 10/369,690, filed Feb. 21, 2003, now U.S. Pat. No. 7,120,767 the contents of which are incorporated herein by reference.

BACKGROUND OF THE INVENTION

The present invention relates to a snapshot creating method, a storage system, and a disk apparatus. In particular, it relates to a snapshot creating method, a disk apparatus, and a storage system in a network-attached storage system for performing a file service via a network.

U.S. Pat. No. 5,790,773, U.S. Pat. No. 5,819,292, and U.S. Pat. No. 5,835,953 have disclosed a computer file system, a snapshot generation, and a mirror disk component. As a prior art on a storage system, there has been proposed and known the network-attached storage (NAS). Based on the NAS, a special-purpose server for providing a file service to a disk apparatus via a network becomes capable of accessing data within the disk apparatus from the network.

Generally speaking, data stored in a storage apparatus necessitates the execution of the back-up processing in preparation for the case where the data has been lost by a malfunction in the apparatus, a defect in a software program, an erroneous operation, or the like. Here, the back-up processing is a processing for copying and saving the data regularly into a magnetic tape or the like so that the lost data will be able to be recovered. The back-up processing is similarly needed in the NAS as well.

If, during the back-up processing task, the data recorded in the storage apparatus has been updated, there occurs an inconsistency in the copied data. Accordingly, it is necessary to prevent the data from being updated during the back-up task so as to guarantee a stored image of the data at a back-up starting point-in-time. In order to avoid the updating of the data to be backed up, it is all right to shutdown all of the programs other than the back-up program which are going to access the data. In the case of a high-availability requested system, however, it is impossible to shutdown the programs for a long time. This situation requires a mechanism for not preventing the programs from updating the data during the back-up, and at the same time for saving the stored image of the data at the back-up starting point-in-time. Usually, a stored image, or a temporal copy, of data at a point-in-time is referred to as "snapshot", and the data that has been targeted for the snapshot creation is referred to as "operational data". In the NAS, as methods of providing a state where it is possible to update the data while saving the snapshot at a specified point-in-time, the following methods have been known: Duplexing of the data by the disk apparatus, saving of the pre-updated data by the NAS processing unit, and the like.

Next, the explanation will be given below concerning the snapshot creating methods according to the above-described prior arts.

As the prior art on the duplexing of the data by the disk apparatus, there has been known the technology described in the above-described U.S. Pat. No. 5,790,773. In this prior art, from a normal state before a snapshot creating instruction is issued, all the data within the disk apparatus are duplexed (i.e., mirrored) into a second storage region. Moreover, in this prior art, when creating a snapshot, a management program within the disk apparatus provides one region for the operational data, and another region for the snapshot data.

Meanwhile, the saving of the pre-updated data by the NAS processing unit is performed by saving the pre-updated stored contents into a different storage region at the time of a data updating after a snapshot creating instruction has been issued from the outside. Logically, the snapshot is accessed as different data that is independent of the operational data. However, a part of the snapshot whose operational data has been not updated after the snapshot creating instruction shares its storage region with the operational data. Only a part of the snapshot whose operational data has been updated is created by making reference to the pre-updated stored contents saved into the different storage region. In the case of the NAS, there exists a snapshot technology in the file or directory unit. Namely, when a snapshot creating instruction is issued from the outside, the NAS processing unit, if a file updating occurs thereinafter, saves the pre-updated file image into a different storage region so as to prevent the data crash from occurring.

In this way, the snapshot technology allows the execution of the snapshot creation. In the above-described prior art regarding the snapshot creating method based on the data duplexing processing by the disk apparatus, the duplexing processing must be executed all over the entire physical volumes. Also, a physical volume becomes necessary whose size is the same as that of the physical volume into which the operational data has been stored. This results in a problem that the necessary storage capacity becomes 2 times larger. Also, in this prior art, when the disk apparatus performs a snapshot creation, the disk apparatus cannot differentiate the data contents of the respective blocks within the physical volume. As a result, the data duplexing is executed with respect to the case of a data block as well which is meaningless to the NAS processing unit, the examples of which are: The case where the data contents within the block have been formatted by the NAS processing unit, the case where, although there exists the data within the block, the data has been not used by the NAS processing unit, and the like. This gives rise to a problem of increasing a CPU load in the disk apparatus, a data communications amount within the disk apparatus, and the like.

Also, the above-described prior art regarding the snapshot creating method by the NAS processing unit is carried out under a condition that the NAS processing unit performs all of the saving/management of the pre-updated data. This condition increases a CPU load in the NAS processing unit, and a data communications amount in the network for connecting the NAS processing unit to the disk apparatus. As a result, there exists a problem that the execution speed of an application program is exceedingly lowered in comparison with the one in a snapshot non-creating system. In particular, there occurs a problem that the performance reduction becomes conspicuous in a processing accompanied by a large quantity of data updating, e.g., a replication of the database.

SUMMARY OF THE INVENTION

It is an object of the present invention to solve the above-described problems, and thereby to provide a snapshot creating method, a disk apparatus and a storage system using this method. Here, in the snapshot creation by the disk apparatus, the snapshot creating method allows the issuing of a snapshot creating instruction in a partition unit.

Also, it is another object of the present invention to provide a snapshot creating method, a disk apparatus and a storage system using this method. Here, in the snapshot creation by the disk apparatus, the snapshot creating method reduces a data communications amount and a necessary storage capacity within the disk apparatus.

It is still another object of the present invention to provide a snapshot creating method, a disk apparatus and a storage system using this method. Here, in the snapshot creation by the disk apparatus, the snapshot creating method allows a snapshot creating instruction in a file/directory unit, decreases a CPU load in the NAS processing unit, and allows reductions in a data processing amount and a necessary storage capacity within the disk apparatus.

According to the present invention, there is provided a storage system, comprising: a 1st data storage, a 2nd data storage connected to said 1st data storage, a processor for controlling said 1st data storage and said 2nd data storage, and data-block analyzing units for receiving data-block information regarding data block so as to store said data-block information into a storage region, said data-block information indicating which data block is to-be-referred-to or a useful data block out of a plurality of data blocks to be referred in said 1st data storage.

According to the present invention, the above-described objects are accomplished as follows: In a snapshot creating method in a storage system including a file server and a disk apparatus, there are provided the following steps: A step of the file server's instructing the disk apparatus in a block whose snapshot data should be generated, and if there occurs an updating request for operational data, a step of the disk apparatus's confirming whether or not an updated-data written-in destination block in an operational data storing region has been targeted for a snapshot-data creation block or specified block, and if the updated-data written-in destination block has not been targeted for the snapshot data generation, a step of the disk apparatus's instructing a disk controller to write updated data into the operational data storing region, and if the block to be updated-data written-in destination block has become the snapshot-data generation specified block, a step of the disk apparatus's confirming whether or not the specified block had been copied into a snapshot data storing region before, and if the specified block had been copied before, a step of the disk apparatus's instructing the disk controller to write the updated data into the operational data storing region, and if the specified block had not been copied before, a step of the disk apparatus's instructing the disk controller to copy pre-updated data into the snapshot data storing region, the pre-updated data existing in the operational data storing region, and a step of the disk apparatus's receiving the instruction of copying the pre-updated data, and confirming whether or not the snapshot data storing region has been ascertained or ensured, and if the snapshot data storing region has not been ensured, a step of the disk apparatus's ensuring the snapshot data storing region, and a step of the disk apparatus's copying the pre-updated data into the snapshot data storing region, and at the same time generating a block-address correspondence table if necessary, and a step of the disk apparatus's writing the updated data into the written-in destination block in the operational data storing region.

Also, the above-described objects are accomplished by configuring a disk apparatus as follows: The disk apparatus includes a specified-block analyzing unit for receiving, from a file server, an instruction of a block specified as the target of a snapshot creation, and for making a judgment as to whether the snapshot data generation is of a necessity or not in accordance with the instruction, a disk controller for executing the data copy on the basis of the judgment by the specified-block analyzing unit, an operational data storing region for saving operational data, and a snapshot data storing region for saving the snapshot data.

Moreover, the above-described objects are accomplished as follows: In a storage system including a file server and a disk apparatus, the file server includes an instruction unit for instructing the disk apparatus in a block whose snapshot data should be generated, and a transmission unit for transmitting updated data to the disk apparatus, and at the same time transmitting the instruction of the block as additional information.

DESCRIPTION OF THE EMBODIMENTS

Figure 1:
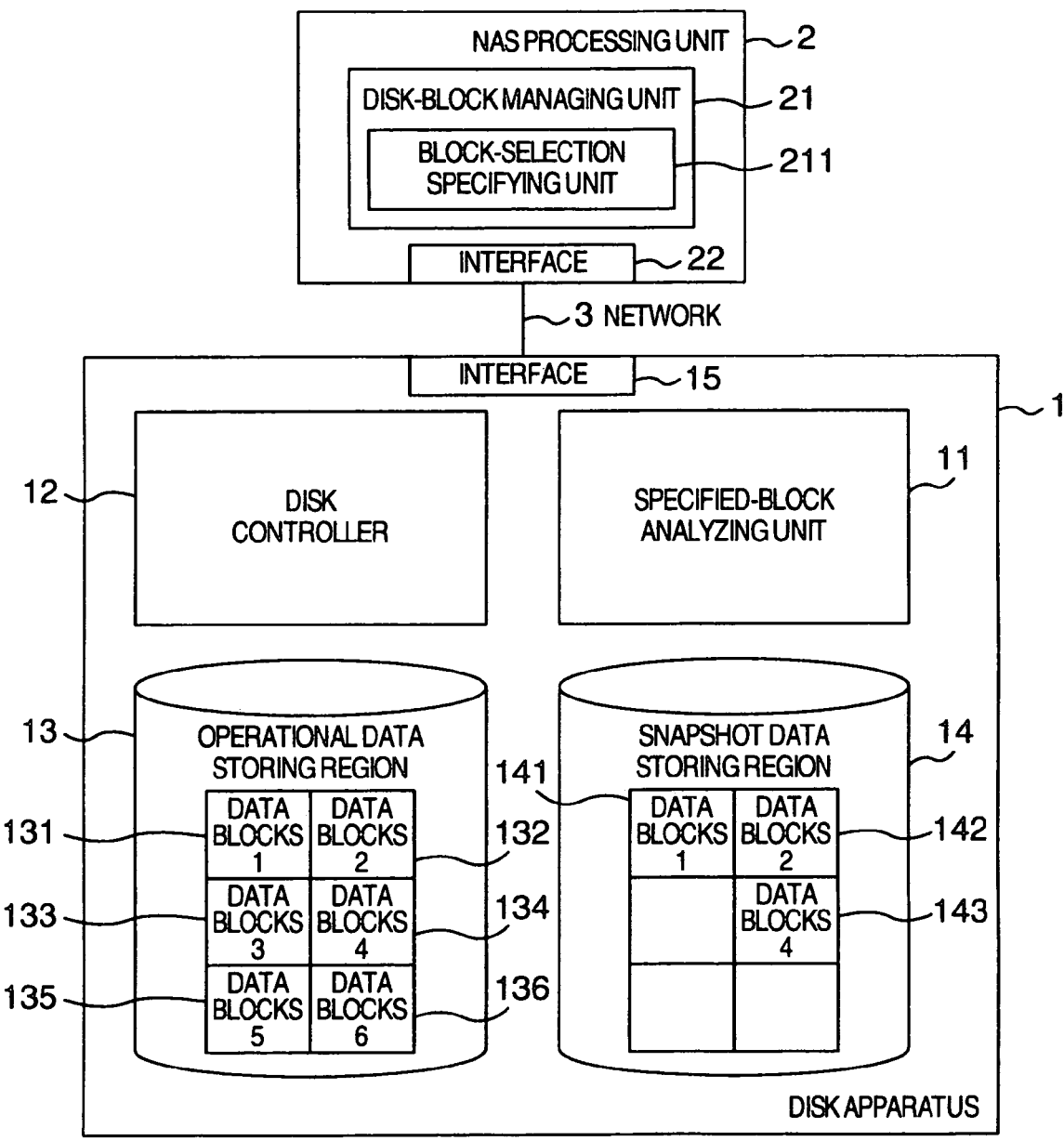
FIG. 1 is a block diagram for illustrating the configuration of a storage system according to a 1st embodiment of the present invention.

Hereinafter, referring to the drawings, the detailed explanation will be given below concerning a snapshot creating method according to the present invention, a storage system and a disk apparatus using this method.

FIG. 1 is a block diagram for illustrating the configuration of a storage system according to a 1st embodiment of the present invention. In FIG. 1, the reference numerals denote the following configuration components: 1 a disk apparatus, 2 a NAS processing unit, 3 a network, 11 a specified-block analyzing unit, 12 a disk controller, 13 an operational data storing region, 14 a snapshot data storing region, 15, 22 interfaces, 21 a disk-block managing unit, 131 to 136, 141 to 143 data blocks, 211 a block-selection specifying unit.

As illustrated in FIG. 1, the storage system according to the 1st embodiment of the present invention includes the following: The disk apparatus 1 for saving data, the NAS processing unit 2 that, as a file server, performs a processing for providing a file service via the network, and the network 3 for connecting the disk apparatus 1 to the NAS processing unit 2.

In addition, the disk apparatus 1 includes the following: The specified-block analyzing unit 11 for performing the analysis of a specified block and the management of snapshot data, the disk controller 12 for performing the allocation of a physical volume, the copy of block data, and the writing-in of updated data, the operational data storing region 13 for saving operational data, the snapshot data storing region 14 for saving the snapshot data, and the interface 15 for performing the communications with the NAS processing unit 2. The operational data storing region 13 and the snapshot data storing region 14 store the data blocks 131 to 136 and the ones 141 to 143, respectively.

The NAS processing unit 2 includes the disk-block managing unit 21 as a partition managing unit for performing the management of a partition, and the interface 22 for performing the communications with the disk apparatus 1. Namely, the disk-block managing unit 21, in the 1st embodiment, has a function as the partition managing unit, and includes the block-selection specifying unit 211 inside. The block-selection specifying unit 211 selects a block necessary for generating the snapshot data, then specifying the selected block to the specified-block analyzing unit 11 within the disk apparatus 1.

In the 1st embodiment of the present invention configured as described above, consider the case where a snapshot-data generating instruction with respect to one partition or plural partitions (i.e., logical volume or volumes) within a physical volume is issued from the outside to the NAS processing unit 2. In this case, the block-selection specifying unit 211 selects all the blocks included within the above-described one partition or plural partitions, then specifying these selected blocks to the specified-block analyzing unit 11 within the disk apparatus 1.

Figure 2:
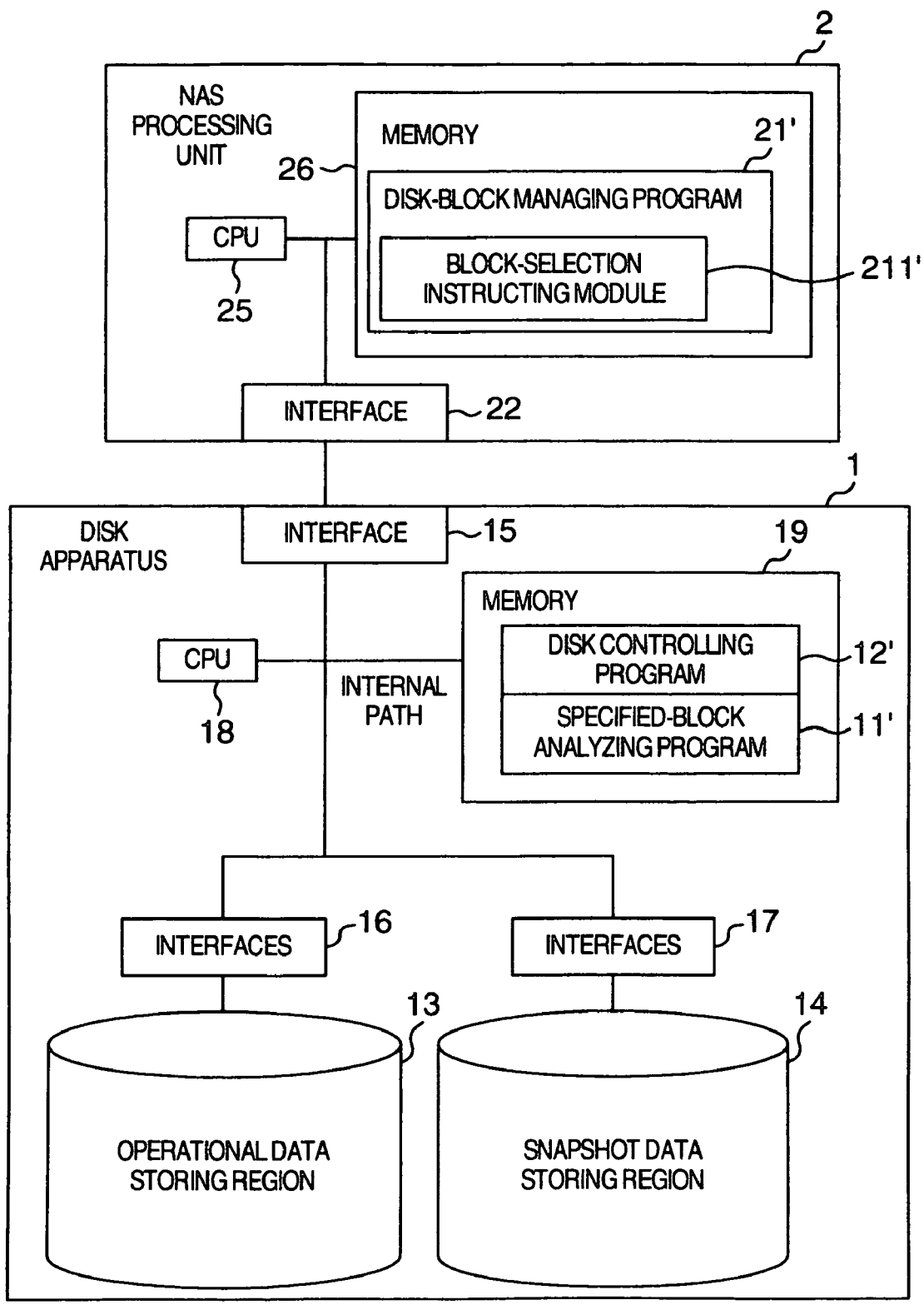
FIG. 2 is a block diagram for illustrating the hardware configuration of the storage system according to the 1st embodiment of the present invention illustrated in FIG. 1.

FIG. 2 is a block diagram for illustrating the hardware configuration of the storage system according to the 1st embodiment of the present invention illustrated in FIG. 1. In FIG. 2, the reference numerals denote the following configuration components: 16, 17 interfaces, 18, 25 CPUs, 19, 26 memories, 11' a specified-block analyzing program, 12' a disk controlling program, 21' a disk-block managing program, 211' a block-selection instructing module. The other reference numerals are the same as those in FIG. 1. Although the interfaces 22 and 15 are connected to the interface 16 or 17 in series, the number of the interfaces can be decreased in the system design.

As illustrated in FIG. 2, the NAS processing unit 2 includes the CPU 25 and the memory 26. Moreover, for the CPU 25 to execute the disk-block managing program 21' within the memory 26 implements the disk-block managing unit 21 illustrated in FIG. 1. Also, for the CPU 25 to execute the block-selection instructing module 211', which is a part of the disk-block managing program 21', implements the block-selection specifying unit 211.

The disk apparatus 1, in addition to the operational data storing region 13 and the snapshot data storing region 14, includes the CPU 18, the memory 19, and the interfaces 16 and 17 corresponding to the operational data storing region 13 and the snapshot data storing region 14 respectively. Furthermore, for the CPU 18 to execute the disk controlling program 12' within the memory 19 implements the disk controller 12 illustrated in FIG. 1. Also, for the CPU 18 to execute the specified-block analyzing program 11' within the memory 19 implements the specified-block analyzing unit 11.

Incidentally, in the embodiment illustrated in FIG. 2, the configuration has been employed where the one set of CPU 18 executes both of the programs, i.e., the disk controlling program 12' and the specified-block analyzing program 11'. It is also possible, however, to provide a plurality of CPUs in the disk apparatus 1 so that the disk controlling program 12' and the specified-block analyzing program 11' are caused to be executed by the different CPUs respectively.

As the configuration of a snapshot target-block specifying unit for instructing the snapshot target blocks from the block-selection specifying unit 211 to the specified-block analyzing unit 11 as was explained earlier, there exist the following two examples: Next, the explanation will be given regarding these examples.

Figure 3:
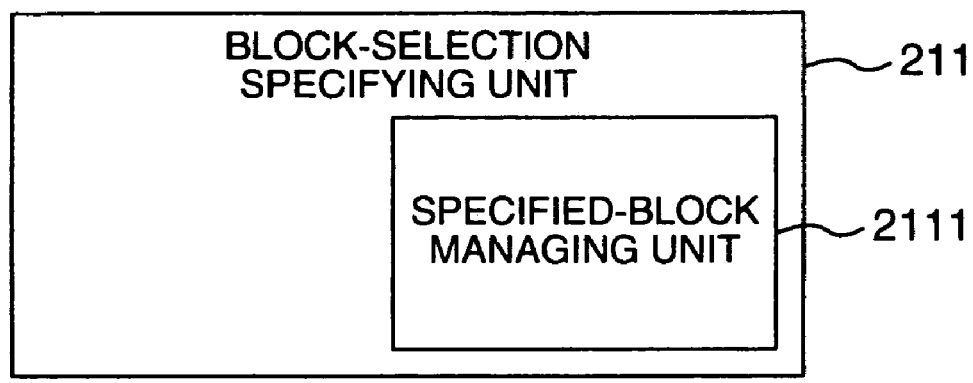
FIG. 3 is a diagram for illustrating a configuration example of a block-selection specifying unit within a NAS processing unit including a specified-block managing unit for managing blocks that become necessary for the snapshot creation of a partition specified from the outside.

FIG. 3 is about an example where a specified-block managing unit 2111 for managing the target blocks that become necessary for the snapshot creation of the partition or partitions specified from the outside is provided within the block-selection specifying unit 211 within the NAS processing unit 2.

In the case of the example illustrated in FIG. 3, the specification of the target blocks from the block-selection specifying unit 211 to the specified-block analyzing unit 11 is carried out as follows: The specification is attached to a command to be transmitted from the NAS processing unit 2 to the disk apparatus 1 via the interfaces 22 and 15, or, a new command is added to the block-selection specifying unit 211. Having received these commands, the specified-block analyzing unit 11 (FIG. 1) performs the analysis of the information on the target-block specification attached to the command, or makes an inquiry using the command newly added to the block-selection specifying unit 211. These tasks allow the specified-block analyzing unit 11 to confirm whether or not, as will be described later, the target blocks are snapshot-data generation target-blocks. If the target blocks are the snapshot-data generation target-blocks, the specified-block analyzing unit 11 instructs the disk controller 12 to generate the snapshot data into the snapshot data storing region 14. The specified-block managing unit can be provided within a data processing unit (not illustrated) in a disk subsystem that has the other type of processing unit instead of the NAS processing unit 2 illustrated in FIG. 1 or FIG. 2.

Figure 4:
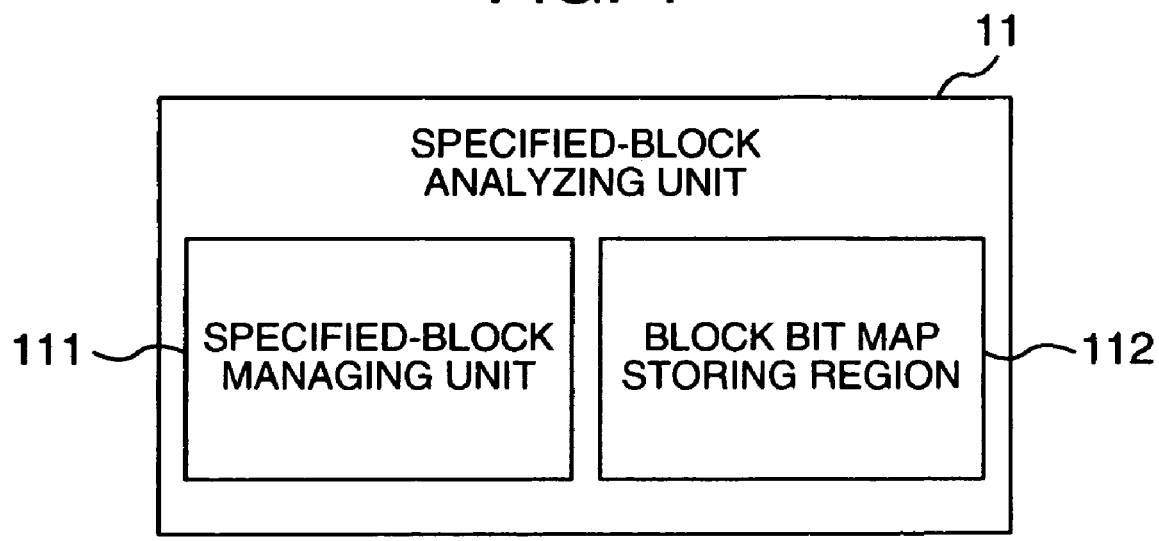
FIG. 4 is a diagram for illustrating a configuration example of a specified-block analyzing unit within a disk apparatus including a specified-block managing unit for managing blocks that become necessary for the snapshot creation of a partition specified from the outside.

FIG. 4 is about an example where a specified-block managing unit 111 for managing the target blocks that become necessary for the snapshot creation of the partition or partitions specified from the outside is provided within the specified-block analyzing unit 11 within the disk apparatus 1.

In the case of the example illustrated in FIG. 4, the specification of the target blocks from the block-selection specifying unit 211 (FIG. 1) to the specified-block analyzing unit 11 (FIG. 4) is carried out as follows: At a point-in-time when the block-selection specifying unit 211 has completed the selection of all the blocks included in the partition or the partitions specified, the block-selection specifying unit 211 writes a block bit map into a block bit map storing region 112 (FIG. 4) provided at a determined position within the disk apparatus 1. Here, the block bit map indicates whether or not the respective blocks within the physical volume are the snapshot-data generation target-blocks. When the snapshot-data generating instruction is issued from the NAS processing unit 2, the specified-block analyzing unit 11 makes reference to this block bit map, thereby confirming whether or not the target blocks are the snapshot-data generation specified-blocks. If the target blocks are the snapshot-data generation specified-blocks, the specified-block analyzing unit 11 causes the disk controller 12 to generate the snapshot data into the snapshot data storing region 14.

In the above explanation of the embodiments of FIGS. 3 and 4, blocks in partitions are specified, however, it is possible to specify blocks including data available for the NAS processing unit, or blocks data of file directories specified for creating the snapshot from outside as explained in the second and third embodiments later.

Figures 5, 7:
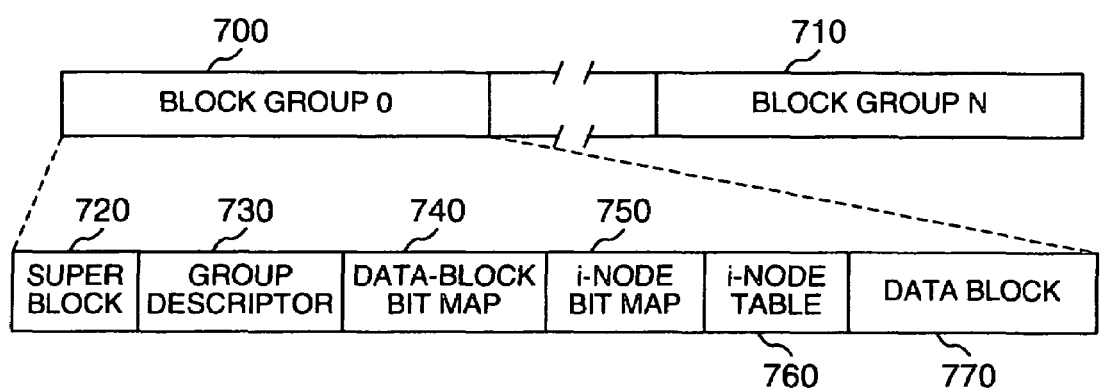
FIG. 5 is a diagram for illustrating an example of a block-address correspondence table between an operational data storing region and a snapshot data storing region.
FIG. 7 is a diagram for explaining a layout example of a file system in the disk apparatus.

FIG. 5 is a diagram for illustrating an example of a block-address correspondence table 400 between the operational data storing region and the snapshot data storing region.

The disk controller 12 manages the block-address correspondence table 400 in order to manage the correspondences between storing-region identifiers (i.e., storing-region identifying numbers) and block addresses in the operational data storing region, and storing-region identifiers (i.e., storing-region identifying numbers) and block addresses in the snapshot data storing region. From the user, reference can be made to the snapshot data as one physical volume.

It is required to indicate that the block addresses of the snapshot data are the same as those of the operational data. Consequently, when generating the snapshot data, the disk controller 12 generates and manages the block-address correspondence table 400, i.e., the correspondence table between the block addresses in the operational data storing region and the ones in the snapshot data storing region.

If the user makes reference to the snapshot data, the disk controller 12 causes the user to make reference thereto at virtual block addresses that are the same as the block addresses of the operational data. If the user makes reference to the respective block addresses, the disk controller 12, based on the block-address correspondence table 400, converts the virtual block addresses into the block addresses in the snapshot data storing region, thereby making reference to the snapshot data corresponding to the respective block addresses of the operational data.

Consider the case where, using the above-described method, a data duplexing instruction is issued from the NAS processing unit 2 to the disk apparatus 1 in order to perform the snapshot creation based on the data duplexing by the disk apparatus 1. In this case, the disk controller 12 ensures a physical volume needed for the snapshot data generation. Moreover, the disk controller 12 judges whether or not the respective blocks are the blocks described in the correspondence table, thereby confirming whether or not the respective blocks have become the snapshot target blocks. Furthermore, the disk controller 12 performs the duplexing concerning only the blocks that have become the target blocks. At this time, the block addresses are required to point at the same data. Accordingly, every time, in the duplexing processing, the disk controller 12 performs the copy and the synchronized writing-in of the respective blocks, the disk controller 12 generates the block-address correspondence table 400 explained using FIG. 5. The storage capacity needed for the duplexing may be of the same size as that of the partition or partitions having become the snapshot creation target. This makes it possible to reduce the storage capacity needed for the snapshot data generation.

Figure 6:
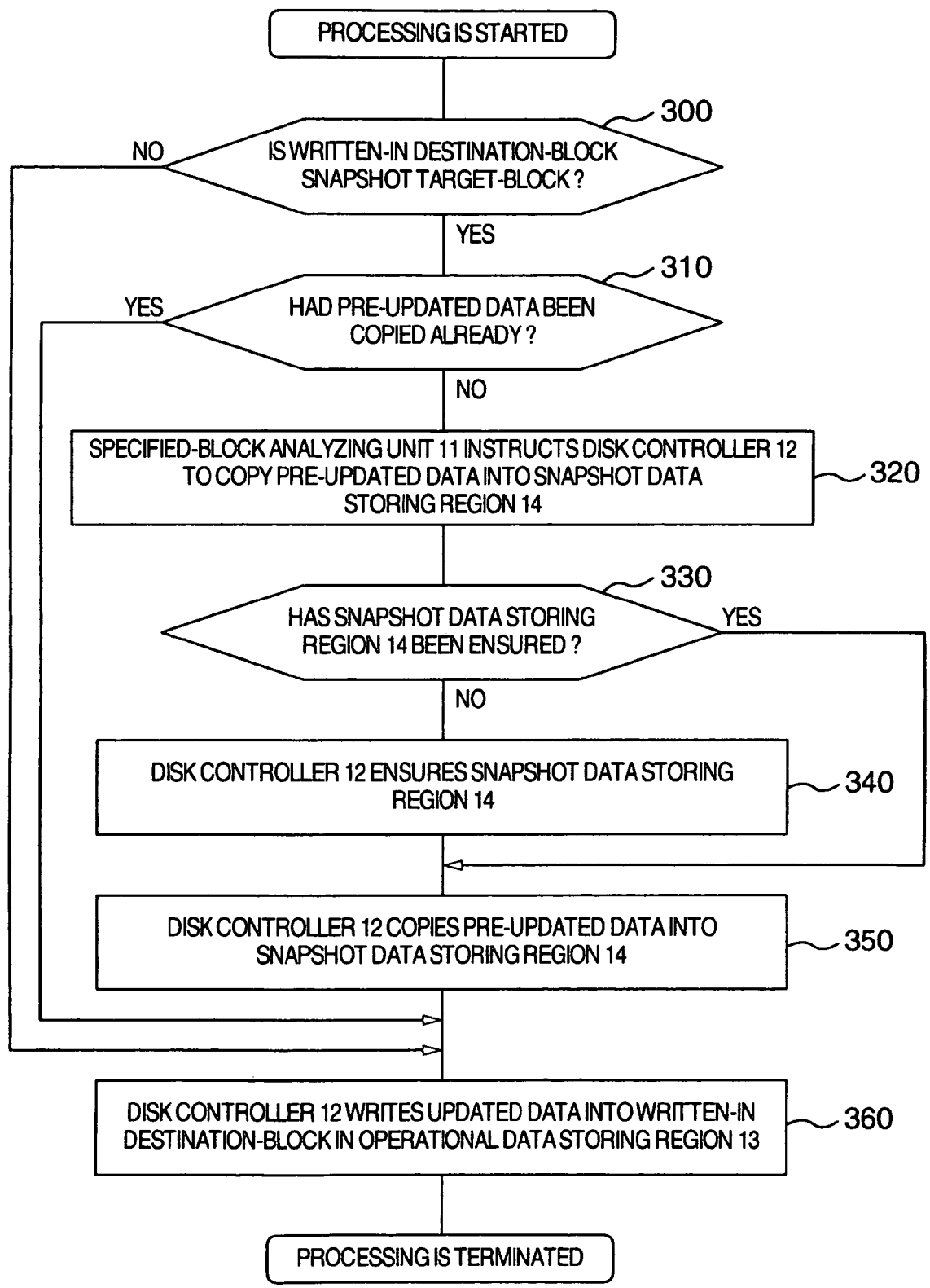
FIG. 6 is a flowchart for explaining the processing operation in the case of the snapshot creation based on the saving of pre-updated data in the disk apparatus.

FIG. 6 is a flowchart for explaining the processing operation in the case of the snapshot creation based on the saving of pre-updated data in the disk apparatus 1. Next, the explanation will be given regarding this flowchart.

(1) If there occurs an updating request for operational data, the specified-block analyzing unit 11 makes reference to the correspondence table 400 and thereby to confirm whether or not an updated-data written-in destination block in the operational data storing region 13 has become a snapshot-data creation specified block (step 300).

(2) If, in the judgment at the step 300, the updated-data written-in destination block has not become a target of the snapshot data generation, the specified-block analyzing unit 11 instructs the disk controller 12 to write the updated data into the operational data storing region 13, then terminating the processing (step 360).

(3) If, in the judgment at the step 300, the updated-data written-in destination block has become the snapshot-data generation specified block, the specified-block analyzing unit 11 confirms whether or not the specified block had been copied into the snapshot data storing region 14 before (step 310).

(4) If, in the judgment at the step 310, the specified block had been copied before, the analyzing unit 11 instructs the disk controller 12 to write the updated data into the operational data storing region 13, then terminating the processing (step 360).

(5) If, in the judgment at the step 310, the specified block had not been copied before, the analyzing unit 11 instructs the disk controller 12 to copy pre-updated data into the snapshot data storing region 14, the pre-updated data existing in the operational data storing region 13 (step 320).

(6) Having received the instruction of copying the pre-updated data, the disk controller 12 confirms whether or not the snapshot data storing region 14 has been ascertained or ensured (step 330).

(7) If, in the judgment at the step 330, the snapshot data storing region 14 has not been ascertained or ensured, the disk controller 12 ensures the snapshot data storing region 14 (step 340).

(8) After having ensured the snapshot data storing region 14 in the processing at the step 340, the disk controller 12 copies the pre-updated data into the snapshot data storing region 14, and at the same time generating the block-address correspondence table if necessary (step 350).

(9) Also, if, in the judgment at the step 330, the snapshot data storing region 14 has been ensured, the disk controller 12 copies the pre-updated data into the snapshot data storing region 14, and at the same time generating the block-address correspondence table if necessary, the pre-updated data existing in the operational data storing region 13 (step 350).

(10) The disk controller 12 writes the updated data into the updated-data written-in destination block in the operational data storing region 13, then terminating the processing (step 360).

If reference is made from the user to the physical volume of the snapshot data, the disk controller 12, when there exists the block-address correspondence table 400, converts the block addresses on the basis of this block-address correspondence table 400. This permits the user to watch the snapshot data at the block addresses that are the same as those of the operational data. Also, when there exists the block-address correspondence table 400, if reference is made to a block of the block address not described in the block-address correspondence table 400, the disk controller 12 directly makes reference to the blocks of the operational data.

The above-described 1st embodiment of the present invention specifies all the blocks included within the partition or partitions becoming the snapshot creation target. This allows the specification of the snapshot creation in the partition unit, thus making it possible to reduce the storage region that becomes necessary for the snapshot creation.

Also, in the snapshot creating method based on the data duplexing, the storage region that becomes necessary for the snapshot creation can be reduced down to a storage region whose size is the same as the partition size. Still also, in the snapshot creating method based on the saving of the pre-updated data, the storage region can be reduced down to a storage region whose size is smaller than the partition size.

Next, the explanation will be given below concerning a 2nd embodiment of the present invention. The 2nd embodiment of the present invention is as follows: In the snapshot creating method based on the data duplexing or the saving of the pre-updated data, at first, consider a file-system managing unit which corresponds to the disk-block managing unit 21 provided in the NAS processing unit 2. Next, the block-selection specifying unit 211 selects a no-data-containing block formatted by the file-system managing unit, or an in-no-use block whose file has been deleted by the file-system managing unit. Moreover, the block-selection specifying unit 211 specifies, to the specified-block analyzing unit 11, the other blocks which include data that are effective to the NAS processing unit 2. The disk apparatus 1 performs the data duplexing or the saving of the pre-updated data regarding only these specified blocks, thereby making it possible to reduce the data processing amount within the disk apparatus 1, and the storage capacity needed for the snapshot creation.

In the 2nd embodiment of the present invention, the disk-block managing unit 21 illustrated in FIG. 1 performs the function as the file-system managing unit. Also, in the 2nd embodiment of the present invention, in the configurations in FIG. 3 and FIG. 4 as well for illustrating the configuration examples of the target-block specifying unit from the block-selection specifying unit 211 to the specified-block analyzing unit 11, the disk-block managing unit 21 performs the function as the file-system managing unit.

The difference between the 2nd embodiment and the 1st embodiment is as follows: The target blocks that the block-selection specifying unit 211 selects as the criterion of the block selection are the blocks including the data that are effective in the NAS processing unit 2.

In the 2nd embodiment of the present invention, when performing the snapshot-data creation based on the data duplexing by the disk apparatus 1, the data duplexing is performed using a method that is basically the same as the one in the 1st embodiment. The 2nd embodiment, however, is based on a premise that a file system manages the data blocks within the physical volume. Thus, the block addresses of the data blocks are specified in metadata in each file/directory. As a result, if, concerning the block address of a block where certain data exists, the block address in the operational data storing region 13 differs from the one in the snapshot data storing region 14, a consistency as the file system cannot be maintained. This situation, in the 2nd embodiment of the present invention, makes it absolutely necessary to generate the block-address correspondence table 400 when performing the saving of the pre-updated data and the synchronized writing-in of the data in the data duplexing processing.

Furthermore, in the 2nd embodiment of the present invention, when performing the snapshot creation based on the saving of the pre-updated data in the disk apparatus 1, a processing is performed which is basically the same as the one in the 1st embodiment in accordance with the flowchart explained using FIG. 6. In the 2nd embodiment, however, generating the block-address correspondence table 400 is absolutely necessary in the processing at the step 350.

As explained above, according to the 2nd embodiment of the present invention, in the snapshot-data creation based on the data duplexing or the saving of the pre-updated data, the disk controller 12 copies only the specified blocks. This makes it possible to copy only the blocks that have the meaning in the NAS processing unit 2, thereby allowing the data communications amount within the disk apparatus 1 to be suppressed down to the smallest possible degree.

Also, in the above-described 2nd embodiment of the present invention, with respect to the already deleted blocks specified from the block-selection specifying unit 211 in the NAS processing unit 2 to the specified-block analyzing unit 11, the disk controller 12 clears the data in a block where the data remains. This eliminates the block which has not been used in the NAS processing unit 2 but in which the data contents remain. As a result, it also becomes possible to use the block for an enhancement in security.

Also, the above-described 1st embodiment and 2nd embodiment can also be carried out in a manner of being co-used together. The co-use allows the snapshot-data generation to be performed regarding only the data blocks that have the meaning in the NAS processing unit 2, while simultaneously issuing the snapshot-data generating instruction in the partition unit. This permits the implementations of a reduction in the storage capacity at the time of the snapshot-data generation, and of a reduction in the data communications amount within the disk apparatus 1.

Next, the explanation will be given below concerning a 3rd embodiment of the present invention. The 3rd embodiment of the present invention is as follows: In the snapshot creating method based on the saving of the pre-updated data, concerning a file/directory specified as a snapshot creation target from the outside by the user, the block-selection specifying unit 211 selects blocks where there exists data of the file/directory and blocks where there exists data related therewith, then specifying the selected blocks to the specified-block managing unit 2111. Moreover, within the disk apparatus 1, the saving of the pre-updated data is performed regarding only the specified blocks. This reduces the data processing amount within the disk apparatus 1 and the storage capacity needed for the snapshot creation, thus decreasing a CPU load for the snapshot creation in the NAS processing unit 2.

In the 3rd embodiment of the present invention, the disk-block managing unit 21 illustrated in FIG. 1 is provided with the function as the file-system managing unit. Also, in the 3rd embodiment of the present invention, in the configurations in FIG. 3 and FIG. 4 as well for illustrating the configurations of the target-block specifying unit from the block-selection specifying unit 211 to the specified-block analyzing unit 11, the disk-block managing unit 21 is provided with the function as the file-system managing unit.

The difference between the 3rd embodiment of the present invention and the 1st and 2nd embodiments thereof is as follows: The target blocks that the block-selection specifying unit 211 selects as the criterion of the block selection are the blocks including the data of the file/directory specified as the snapshot creation target from the outside, and the blocks including the data related therewith.

Furthermore, the 3rd embodiment of the present invention permits the user to watch the snapshot data as one physical volume. In order to make it possible for the user to make reference to the snapshot data within this physical volume, it is required to provide the physical volume in a manner of being able to be mounted as a file system. In order to permit the physical volume including the snapshot data to be watched as the mountable file system, it is required to reproduce the consistency of the file system at the point-in-time of the snapshot creation without changing this consistency at all.

Figure 8:
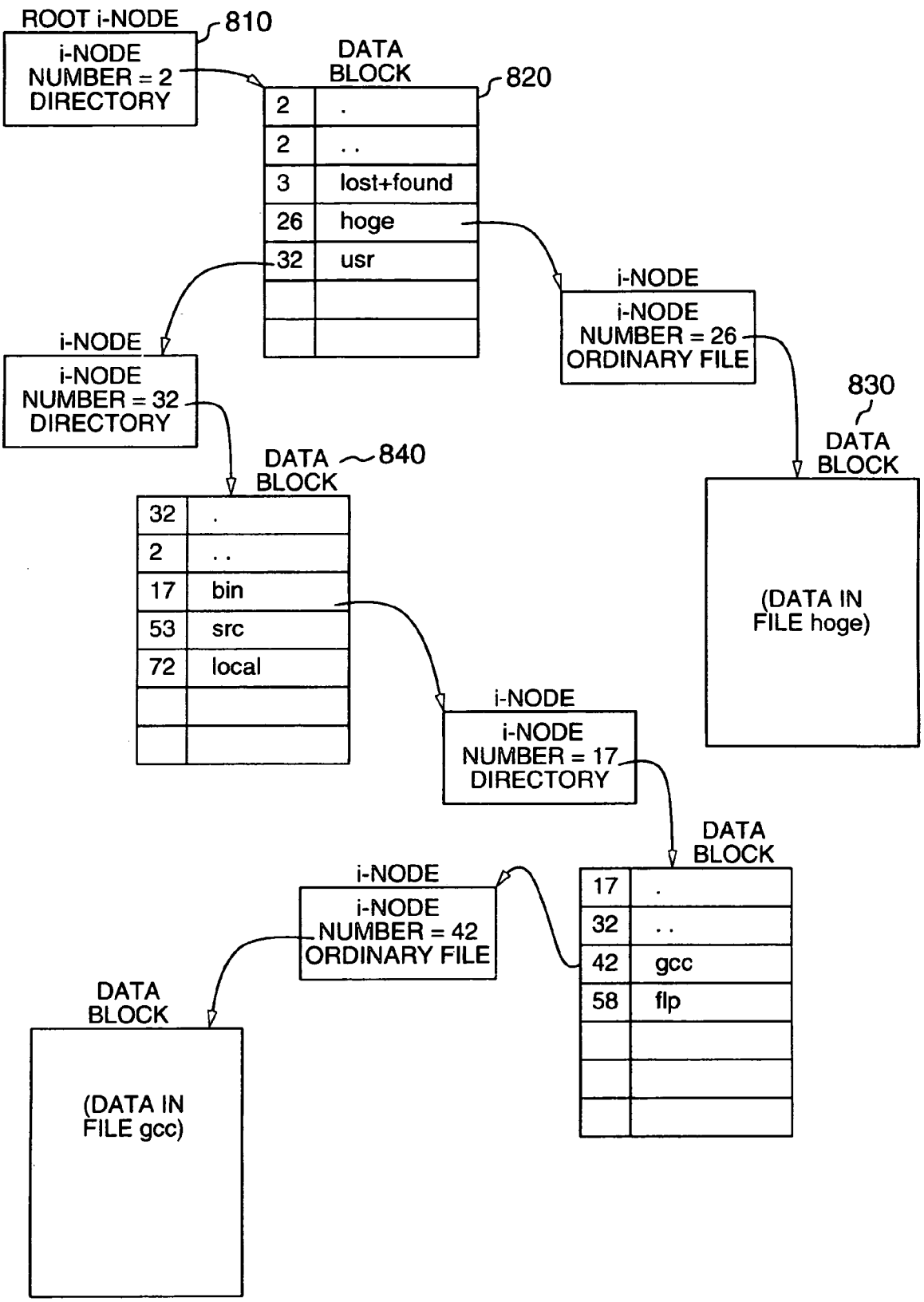
FIG. 8 is a diagram for explaining an example of the logical structure of the file system.

FIG. 7 is a diagram for explaining a layout example of the file system in the disk apparatus. FIG. 8 is a diagram for explaining an example of the logical structure of the file system. Next, referring to FIG. 7 and FIG. 8, the explanation will be given below concerning the file system in the 3rd embodiment.

The file system is configured as follows: As illustrated in FIG. 7, a volume (i.e., a set of disk blocks) allocated within the disk apparatus is divided into plural block groups "0" to "N" 700 to 710. Moreover, the inside of each block group is divided as illustrated by 720 to 770, thereby separating the usage forms. The same super block 720 and the same group descriptor 730 are held within each block group. If data of the super block 720 in the block group "0" 700 is crashed, data of the block group "1" or after is used. A data-block bit map 740 holds information on the usage situation of a data block 770. An i-node bit map 750, which holds metadata based on file names and block addresses at which data exists, holds information on the usage situation of an i-node table 760 used for managing the i-node of a file/directory. The data block 770 is used for a usage form in which the file data and directory entries are stored.

In the example of the logical structure of the file system illustrated in FIG. 8, the location of a root i-node 810 is held as a 1st entry of the i-node table 760. The root i-node 810 refers to a data block 820 that stores the directory entries of a root directory. The data block 820 stores therein a list that refers to names of the files/directories existing in the directory and the i-node of each file/directory. The i-node of each file refers to a data block (i.e., data block 830) that stores the data. The i-node of each directory refers to a data block (i.e., data block 840) that stores the directory entries.

Simultaneously, each i-node illustrated in FIG. 8 holds data that refers to an each i-node's own parent directory. This makes it possible to search for, from the i-node of a file or a directory, where the i-node's own parent directory exists, and further where a directory above the parent directory exists. Namely, recognizing the i-node of a file/directory makes it possible to search for a path from the root directory to the file/directory.

At the time of mounting the file system, the super block 720 and the group descriptor 730 existing in the front-head block group 700 are read in, thereby making reference to the management information on the file system. In order to make mountable the physical volume including the snapshot data, in addition to the block including the metadata and the data of the target file/directory, it is required to store the following information: The super block 720 and the group descriptor 730 existing in the block group "0" 700, and the data-block bit map 740 and the i-node bit map 750 within the block group to which the block including the metadata and the data of the target file/directory belongs.

Also, after mounting the physical volume of the snapshot data, the 3rd embodiment of the present invention, with the image that is the same as the one of the operational data, permits the user to make reference to the path from the root directory to the file/directory that has become the snapshot-data generation target. This makes it necessary to store, in addition to the above-described file-system managing information, the blocks that include all of the metadata and the directory entries of directories existing on the path from the root directory to the target file/directory.

Figure 9:
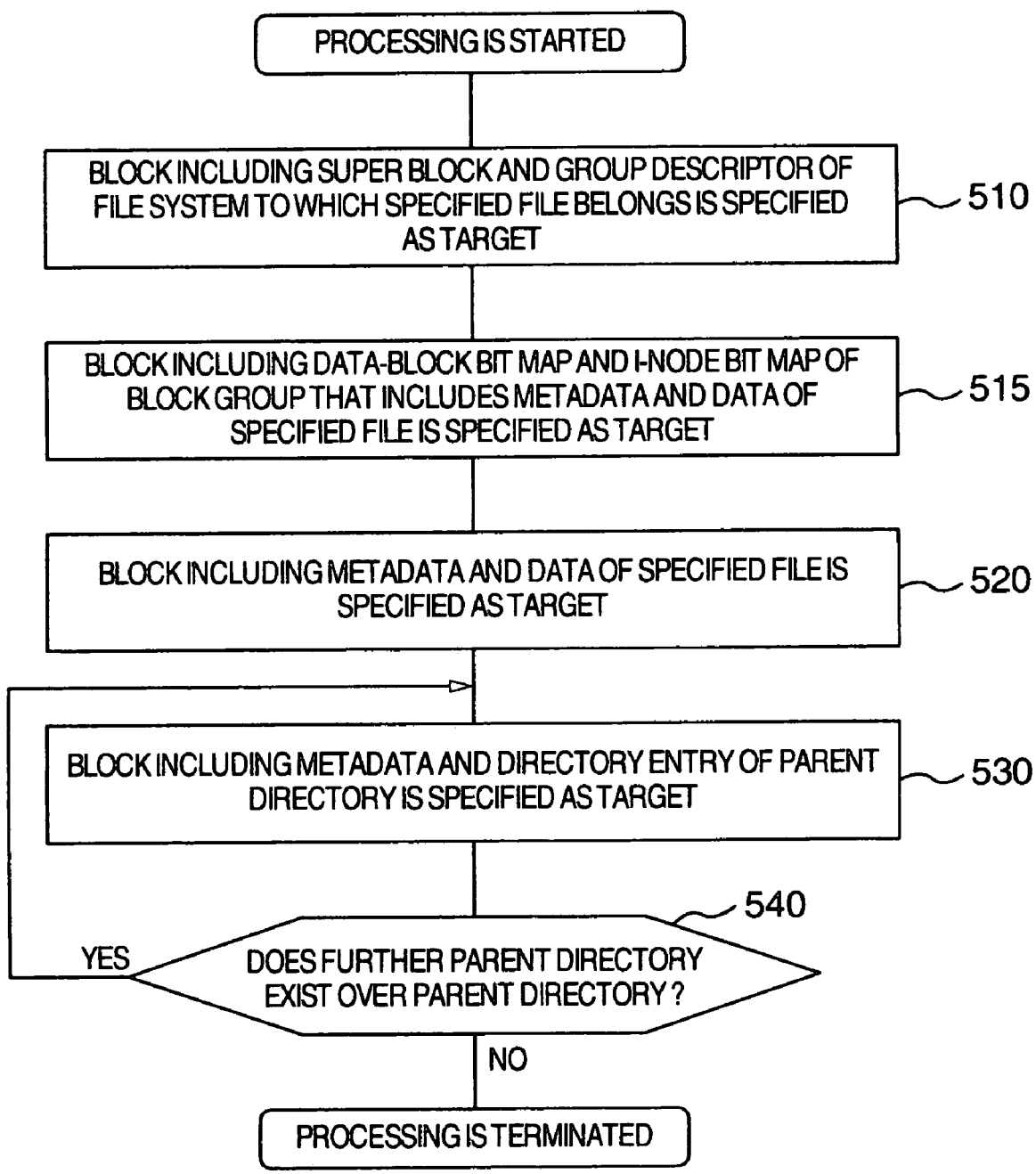
FIG. 9 is a flowchart for explaining the processing steps of the block selection performed by the block-selection specifying unit in the case where a specified target of the snapshot data generation specified by a user is a file.

FIG. 9 is a flowchart for explaining the processing steps of the block selection performed in the block-selection specifying unit 211 in the case where the snapshot-data generation specified-target specified by the user is a file. Next, the explanation will be given regarding this flowchart.

(1) The user specifies, as a snapshot-data generation target-block, a block including a super block and a group descriptor of a file system to which the specified file belongs (step 510).

(2) A block including a data-block bit map and an i-node bit map of a block group to which the specified file belongs is specified as the snapshot-data generation target-block (step 515).

(3) A block including metadata and data of the specified file is specified as the snapshot-data generation target-block (step 520).

(4) A block including metadata and a directory entry of a parent directory of the specified file is specified as the snapshot-data generation target-block (step 530).

(5) It is confirmed whether or not a further parent directory exists over the parent directory of the specified file (step 540).

(6) If, in the judgment at the step 540, the further parent directory exists over the parent directory, the processing goes back to the step 530, and basically the same processing is continued with respect to this directory.

(7) If, in the judgment at the step 540, no directory exists over the parent directory, the processing is terminated.

Figure 10:
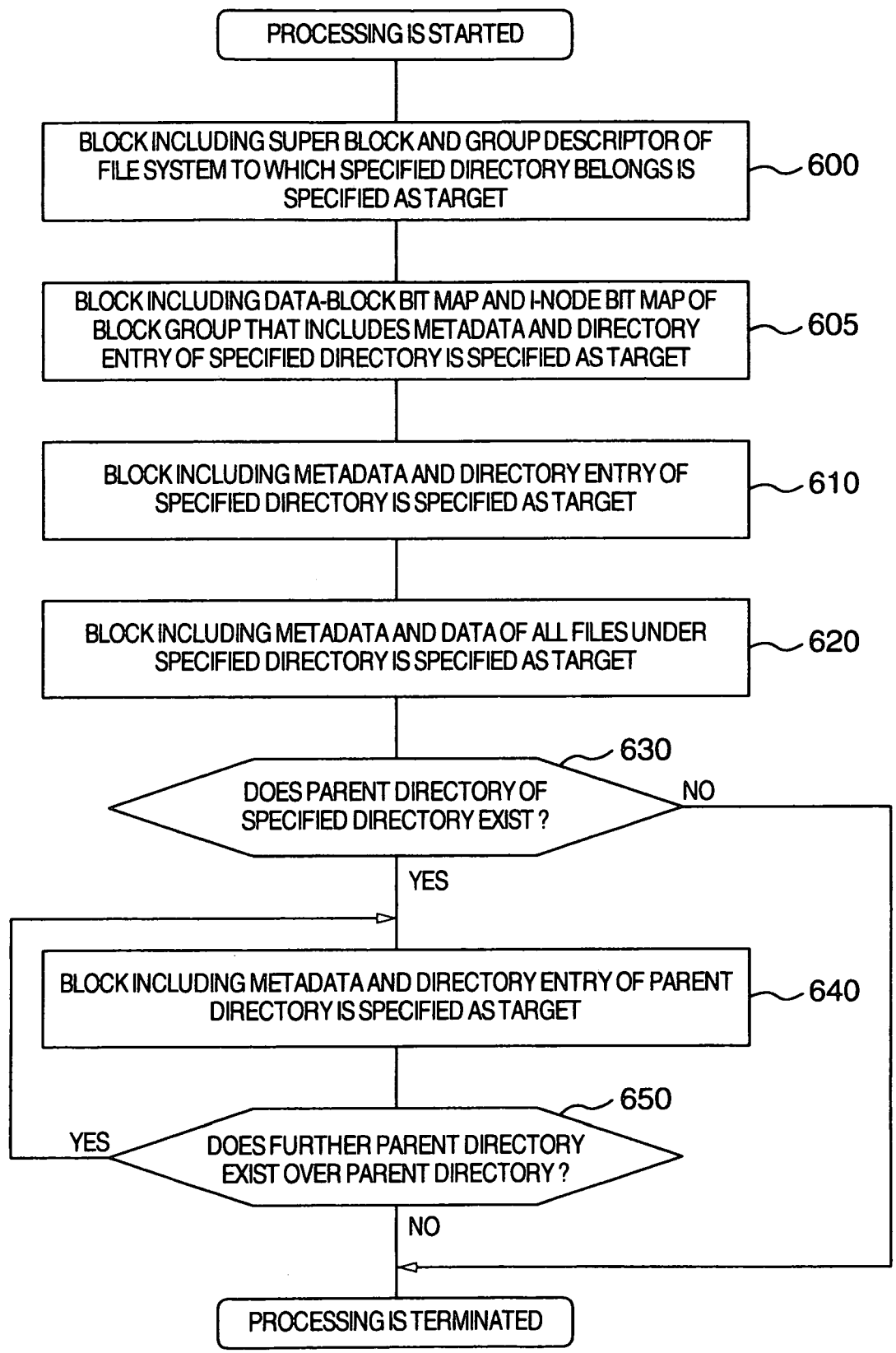
FIG. 10 is a flowchart for explaining the processing steps of the block selection performed by the block-selection specifying unit in the case where the specified target of the snapshot data generation specified by the user is a directory.

FIG. 10 is a flowchart for explaining the processing steps of the block selection performed in the block-selection specifying unit 211 in the case where the snapshot-data generation specified-target specified by the user is a directory. Next, the explanation will be given regarding this flowchart.

(1) A block including a super block and a group descriptor of a file system to which the directory specified by the user belongs is specified as a snapshot-data generation target-block (step 600).

(2) A block including a data-block bit map and an i-node bit map of a block group to which the specified directory belongs is specified as the snapshot-data generation target-block (step 605).

(2) A block including metadata and a directory entry of the specified directory is specified as the snapshot-data generation target-block (step 610).

(3) A block including metadata and data of all the files under the specified directory is specified as the snapshot-data generation target-block (step 620).

(4) It is confirmed whether or not a parent directory of the specified directory exists (step 630).

(4) If, in the judgment at the step 630, no parent directory exists, the processing is terminated.

(5) If, in the judgment at the step 630, the parent directory exists, a block including metadata and a directory entry of the parent directory is specified as the snapshot-data generation target-block (step 640).

(6) It is confirmed whether or not a further parent directory exists over a directory into which the block of the metadata and the directory entry has been stored at the step 640 (step 650).

(7) If, in the judgment at the step 650, no directory exists over the directory further, the processing is terminated.

(8) If, in the judgment at the step 650, the further parent directory exists over the directory, the processing goes back to the step 640, and the processing is performed again with this directory specified as the target.

Each processing according to each of the above-described embodiments of the present invention can be configured as a processing program. This processing program can be provided by being stored into a storage medium such as a HD, a DAT, a FD, a MO, a DVD-ROM, or a CD-ROM.

The above-described 1st, 2nd, and 3rd embodiments can be co-used together. Also, in the 1st, 2nd, and 3rd embodiments, the NAS processing unit and the disk apparatus may be set up at locations that are away from each other, and a wide area network may establish the connection therebetween. Otherwise, the NAS processing unit and the disk apparatus may be configured in an integrated manner. In this case, the network may be a system path for simply connecting both of them.

As having been explained so far, in the snapshot creation in the disk apparatus, the present invention makes it possible to reduce the disk capacity needed for the snapshot creation.

Also, in the snapshot creation in the disk apparatus, the present invention makes it possible to issue the snapshot creating instruction in the unit of the partition or file/directory managed in the NAS processing unit.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A file server for providing a file system configuring a plurality of directories and a plurality of files with respect to an external device, said file server being coupled to a disk apparatus which includes a first volume and a second volume, said file server comprising:
   a disk interface coupled to the disk apparatus; and
   a processor coupled to the disk interface,
   wherein the processor receives, from the external device, a request for creating a snapshot of a file or a directory, and
   wherein if the request is to create a snapshot of a file, then the processor selects blocks related to the file as a target and related to metadata of the file as a target, specifies metadata of a directory including the file as a target, and sends, to the disk apparatus, an instruction for creating the snapshot to be stored in the second volume according to the selected blocks.

2. A file server according to claim 1, wherein a block including a super block and group descriptor of the file system to which the file belongs is specified as a target.

3. A file server according to claim 2, wherein a block including a data block bit map and an mode bit map of a block group that includes metadata and data of the file is specified as a target.

4. A file server according to claim 3, wherein a block including metadata and data of the file is specified as the target.

5. A file server according to claim 4, wherein a block including metadata and a directory entry of a parent directory is specified as a target.

6. A file server according to claim 5, wherein a determination is made as to whether a further parent directory exist over the parent directory.

7. A file server according to claim 2, wherein if the request is to create a snapshot of a directory, then the processor selects blocks related to the directory as a target, and related to metadata of the directory as a target and related metadata of a file belonging to the directory, and sends, to the disk apparatus, an instruction for creating the snapshot to be stored in the second volume according to the selected blocks.

8. A computer system comprising:
   a file server for providing a file system configuring a plurality of directories and a plurality of files with respect to an external device; and
   a disk apparatus coupled to the file server,
   wherein the disk apparatus includes a first volume and a second volume for storing data,
   wherein said file server comprises:
   a disk interface coupled to the disk apparatus, and
   a processor coupled to the disk interface,
   wherein the processor receives from the external device a request for creating a snapshot of a file or a directory, and
   wherein if the request is to create a snapshot of a file, then the processor selects blocks related to the file as a target and related to metadata of the file as a target, specifies metadata of a directory including the file as a target, and sends, to the disk apparatus, an instruction for creating the snapshot to be stored in the second volume according to the selected blocks.

9. A computer system according to claim 8, wherein a block including a super block and group descriptor of the file system to which the file belongs is specified as a target.

10. A computer system according to claim 9, wherein a block including a data block bit map and an mode bit map of a block group that includes metadata and data of the file is specified as a target.

11. A computer system according to claim 10, wherein a block including metadata and data of the file is specified as the target.

12. A computer system according to claim 11, wherein a block including metadata and a directory entry of a parent directory is specified as a target.

13. A computer system according to claim 12, wherein a determination is made as to whether a further parent directory exist over the parent directory.

14. A computer system according to claim 8, wherein if the request is to create a snapshot of a directory, then the processor selects blocks related to the directory as a target, and related to metadata of the directory as a target and related metadata of a file belonging to the directory, and sends, to the disk apparatus, an instruction for creating the snapshot to be stored in the second volume according to the selected blocks.

* * * * *